(12) United States Patent
Ji et al.

(10) Patent No.: US 11,461,925 B2
(45) Date of Patent: Oct. 4, 2022

(54) POSE PREDICTION METHOD AND APPARATUS, AND MODEL TRAINING METHOD AND APPARATUS

(71) Applicant: TSINGHUA UNIVERSITY, Beijing (CN)

(72) Inventors: Xiangyang Ji, Beijing (CN); Zhigang Li, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 17/679,142

(22) Filed: Feb. 24, 2022

(65) Prior Publication Data

US 2022/0180553 A1 Jun. 9, 2022

Related U.S. Application Data

(63) Continuation of application No. PCT/CN2019/106136, filed on Sep. 17, 2019.

(30) Foreign Application Priority Data

Aug. 30, 2019 (CN) .......................... 201910815666,5

(51) Int. Cl.
*G06T 7/73* (2017.01)
(52) U.S. Cl.
CPC ...... *G06T 7/73* (2017.01); *G06T 2207/20081* (2013.01); *G06T 2207/20084* (2013.01)
(58) Field of Classification Search
CPC ............. G06T 7/73; G06T 2207/20081; G06T 2207/20084
See application file for complete search history.

(56) References Cited

U.S. PATENT DOCUMENTS

| 2019/0200919 | A1  | 7/2019 | Nakao   |              |
|--------------|-----|--------|---------|--------------|
| 2021/0241522 | A1* | 8/2021 | Guler   | G06T 7/75    |
| 2022/0178854 | A1* | 6/2022 | Fouchier| G01N 23/2254 |

FOREIGN PATENT DOCUMENTS

| CN | 109615655 A | 4/2019 |
| CN | 109815800 A | 5/2019 |
| CN | 110119148 A | 8/2019 |
| GN | 106875446 A | 6/2017 |
| GN | 109215080 A | 1/2019 |
| GN | 109284681 A | 1/2019 |

* cited by examiner

*Primary Examiner* — Bobbak Safaipour

(57) ABSTRACT

Provided are a pose prediction method and apparatus, and a model training method and apparatus. The pose prediction method includes: performing target identification on a first image to be predicted to determine an area where a target object is located; determining a transformed target image based on the area where the target object is located; inputting the transformed target image into a pose decoupling prediction model for pose prediction; and determining a rotation amount of the target object based on an outputted result of a rotation amount branch network of the pose decoupling prediction model and determining a translation amount of the target object based on an outputted result of rotation amount branch network of the pose decoupling prediction model. By means of decoupling rotation and translation in object pose, the accuracy of pose prediction can be improved.

20 Claims, 6 Drawing Sheets

POSE PREDICTION METHOD AND APPARATUS, AND MODEL TRAINING METHOD AND APPARATUS

CROSS-REFERENCE TO RELATED APPLICATIONS

This application is a continuation of International Patent Application No. PCT/CN2019/106136, filed on Sep. 17, 2019, which claims priority to Chinese Patent Application No. 201910815666.5, filed on Aug. 30, 2019, the entire disclosures of which are hereby incorporated here by their references.

FIELD

The present disclosure relates to the field of computer visions, and more particularly, to a pose prediction method and apparatus, and a model training method and apparatus.

BACKGROUND

Object pose estimation plays a vital role in robot operations, autonomous driving, and augmented reality, etc. The object pose estimation refers to accurately estimating, from a picture, pose information of a target object relative to a camera. The pose information usually includes a rotation amount and a translation amount, the rotation amount can represent a rotation relation of a coordinate system of the camera relative to a coordinate system of the target object, and the translation amount can represent translation information of an origin of the coordinate system of the camera relative to an origin of the coordinate system of the target object.

The object pose estimation is likely to be affected by factors such as occlusion, illumination change, and symmetry of the object. It is very challenging to accurately estimate the rotation amount and the translation amount of the camera relative to the target object. In related art, it is difficult to estimate both the rotation amount and the translation amount with high accuracy.

SUMMARY

In view of this, the present disclosure provides a pose prediction method and apparatus, and a model training method and apparatuses.

According to a first aspect of the present disclosure, provided is a pose prediction method. The method includes: performing target identification on a first image to be predicted to determine an area where a target object is located; determining a transformed target image based on the area where the target object is located; inputting the transformed target image into a pose decoupling prediction model for pose prediction, wherein the pose decoupling prediction model includes a base network configured to extract features from the transformed target image, a rotation amount branch network configured to predict a rotation amount of the target object based on the features, and a translation amount branch network configured to predict a translation amount of the target object based on the features; and determining the rotation amount of the target object based on an outputted result of the rotation amount branch network and determining the translation amount of the target object based on an outputted result of the translation amount branch network.

According to a second aspect of the present disclosure, a model training method is provided. The method includes: performing target identification on a third image to be trained to determine an area where a training object is located; adding a scale disturbance and a position disturbance to the area where the training object is located to obtain a disturbed object area; extracting the disturbed object area from the third image to obtain a fourth image; transforming a size of the fourth image into a desired size for input of the pose decoupling prediction model, while maintaining an aspect ratio of the training object unchanged, to obtain a training image; and training the pose decoupling prediction model using the training image as the input of the pose decoupling prediction model.

According to a third aspect of the present disclosure, provided is a pose prediction apparatus. The apparatus includes: a first determination module configured to perform target identification on a first image to be predicted to determine an area where a target object is located; and a second determination module configured to determine a transformed target image based on the area where the target object is located; an input module configured to input the transformed target image into a pose decoupling prediction model for pose prediction, wherein the pose decoupling prediction model includes a base network configured to extract features from the transformed target image, a rotation amount branch network configured to predict a rotation amount of the target object based on the features, and a translation amount branch network configured to predict a translation amount of the target object based on the features; and a third determination module configured to determine the rotation amount of the target object based on an outputted result of the rotation amount branch network and determine the translation amount of the target object based on an outputted result of the translation amount branch network.

According to a fourth aspect of the present disclosure, provided is a model training apparatus. The apparatus includes: a first determination module configured to perform target identification on a third image to be trained to determine an area where a training object is located; a disturbance module configured to add a scale disturbance and a position disturbance to the area where the training object is located to obtain a disturbed object area; an extraction module configured to extract the disturbed object area from the third image to obtain a fourth image; a transformation module configured to transform a size of the fourth image into a desired size for input of a pose decoupling prediction model while maintaining an aspect ratio of the training object unchanged, to obtain a training image; an input module configured to train the pose decoupling prediction model using the training image as the input of the pose decoupling prediction model.

According to a fifth aspect of the present disclosure, provided is a pose prediction apparatus. The apparatus includes: a processor; and a memory having instructions stored thereon, the instructions are executable by the processor, and the processor is configured to implement the method according to the first aspect.

According to a sixth aspect of the present disclosure, provided is a non-volatile computer-readable storage medium having computer program instructions stored thereon, and the computer program instructions, when executed by a processor, implement the method according to the first aspect.

According to a seventh aspect of the present disclosure, provided is a pose prediction apparatus. The apparatus includes: a processor; and a memory having instructions stored thereon, the instructions are executable by the processor, and the processor is configured to implement the method according to the second aspect.

According to an eighth aspect of the present disclosure, provided is a non-volatile computer-readable storage medium having computer program instructions stored thereon, and the computer program instructions, when executed by a processor, implement the method according to the second aspect.

In the embodiments of the present disclosure, the rotation amount of the target object can be predicted by the rotation amount branch network of the pose decoupling prediction model, and the translation amount of the target object can be predicted by the translation amount branch network of the pose decoupling prediction model, which realizes decoupling of rotation and translation in the object pose. In this way, it is conducive to adopt different strategies to predict the rotation amount and the translation amount with respect to properties of the rotation and the translation in the object pose, so as to achieve a high-accuracy estimation of both the rotation amount and the translation amount, and improve the accuracy of pose prediction.

According to the following detailed description of exemplary embodiments with reference to the accompanying drawings, other features and aspects of the present disclosure will become clear.

BRIEF DESCRIPTION OF DRAWINGS

The drawings included in the specification and constituting a part of the specification together with the specification illustrate exemplary embodiments, features, and aspects of the present disclosure, and are used to explain the principle of the present disclosure.

DESCRIPTION OF EMBODIMENTS

Figure 1:
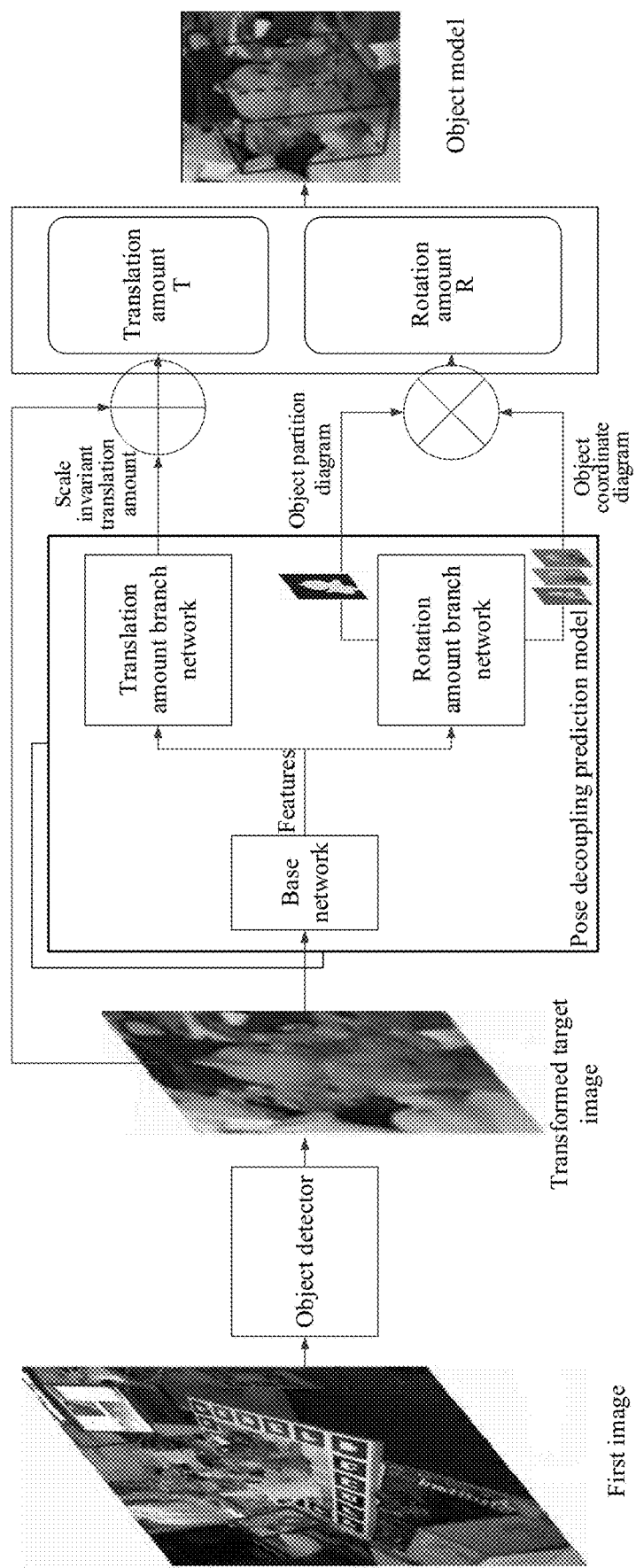
FIG. 1 illustrates a schematic structural diagram of a pose prediction network according to an embodiment of the present disclosure.

Hereinafter, various exemplary embodiments, features, and aspects of the present disclosure will be described in detail with reference to the drawings. The same reference numerals in the drawings indicate elements with the same or similar functions. Although various aspects of the embodiments are illustrated in the drawings, the drawings are not necessarily drawn to scale, unless otherwise indicated.

The dedicated word "exemplary" here means "serving as an example, embodiment, or illustration". Any embodiment described herein with "exemplary" should not necessarily be construed as being superior or better than other embodiments.

In addition, in order to better illustrate the present disclosure, numerous specific details are given in the following specific embodiments. Those skilled in the art should understand that the present disclosure can be implemented without certain specific details. In some instances, the methods, means, elements, and circuits well-known to those skilled in the art are not described in detail in order to highlight the gist of the present disclosure.

Object pose estimation methods can be divided into two categories: indirect method and direct method. In the direct method, a prediction model directly predicts pose information of an object from an image, and there is no need to know three-dimensional model information of the object and an object pose can be quickly estimated in this method. In the direct method, a relatively accurate translation amount can be obtained, but prediction of a rotation amount between the object and a camera is not accurate enough. In the indirect method, a corresponding relation between a two-dimensional image and a three-dimensional object model needs to be established first, and then the corresponding relation is solved by a geometric method (such as the PnP algorithm, etc.) to obtain pose information of the object. In the indirect method, a relatively accurate rotation amount can be obtained, but prediction of the translation amount between the object and the camera is not accurate enough.

In some embodiments of the present disclosure, considering a big difference in properties between rotation and translation in object pose (for example, prediction of the translation amount is mainly based on a position and a size of an object in an image, and prediction of the rotation amount mainly depends on appearance of the object in the image), an object pose decoupling prediction model and a pose prediction method based on the object pose decoupling prediction model are provided. In the pose prediction method, the rotation and the translation in the object pose are treated separately, and the rotation amount and the translation amount are estimated by appropriate methods respectively, so as to improve the accuracy of pose prediction.

FIG. 1 illustrates a schematic structural diagram of a pose prediction network according to an embodiment of the present disclosure. As illustrated in FIG. 1, the pose prediction network may include an object detector and a pose decoupling prediction model. The pose decoupling prediction model can include at least one base network, a rotation amount branch network and a translation amount branch network.

The object detector is configured to detect an area where a target object is located in an input image. The object detector can be any network capable of identifying the target object, which is not limited in the present disclosure.

The base network is configured to extract features from an input image, and the base network can be any network capable of extracting features from an image, which is not limited in the present disclosure.

In a possible implementation, the base network may include a first base network and a second base network (not shown). The first base network may extract a first feature from an input image, and the second base network may extract a second feature from the input image. A terminal may input the first feature into the rotation amount branch network, and the rotation amount branch network predicts the rotation amount of the target object based on the first feature. The terminal may input the second feature into the translation amount branch network, and the translation amount branch network predicts the translation amount of the target object based on the second feature. The network structures of the first base network and the second base network may be the same or different, which is not limited in the present disclosure. In an example, the first base network can extract an appearance feature of the object in the image as the first feature, and the second base network can extract a position feature and a size feature of the object in the image as the second feature. In this way, features are extracted by split base networks, respectively, and it is beneficial for the subsequent prediction of the rotation amount branch network and translation amount branch network based on the features.

The rotation amount branch network is configured to predict the rotation amount of the target object based on the feature extracted by the base network. In an embodiment of the present disclosure, the indirect method is used to predict the rotation amount of the object. As mentioned above, in the indirect method, a corresponding relation between a two-dimensional image and a three-dimensional model is needed to be established, and then the corresponding relation is solved to obtain the rotation amount R of the target object.

In a possible implementation, for each pixel belonging to the target object in the input image, the rotation amount branch network can predict three-dimensional coordinate values of a corresponding point on an object model (referred to as an object three-dimensional coordinate prediction method), so as to establish the corresponding relation between the image and the object model.

In a possible implementation, several key points can be first defined on the object model, and then position information of these key points in the input image corresponding to the object model is predicted using the rotation amount branch network (referred to as an object key point detection method), so as to establish the corresponding relation between the image and the object model.

The structure of the rotation amount branch network is adapted to the method for establishing the corresponding relation between the image and the object model.

The translation amount branch network is configured to predict the translation amount of the target object based on the feature extracted by the base network. In some embodiments of the present disclosure, the direct method is used to predict the translation amount of the object. As illustrated above, the direct method can determine the translation amount T based on an outputted result of the translation amount branch network.

Figure 2:
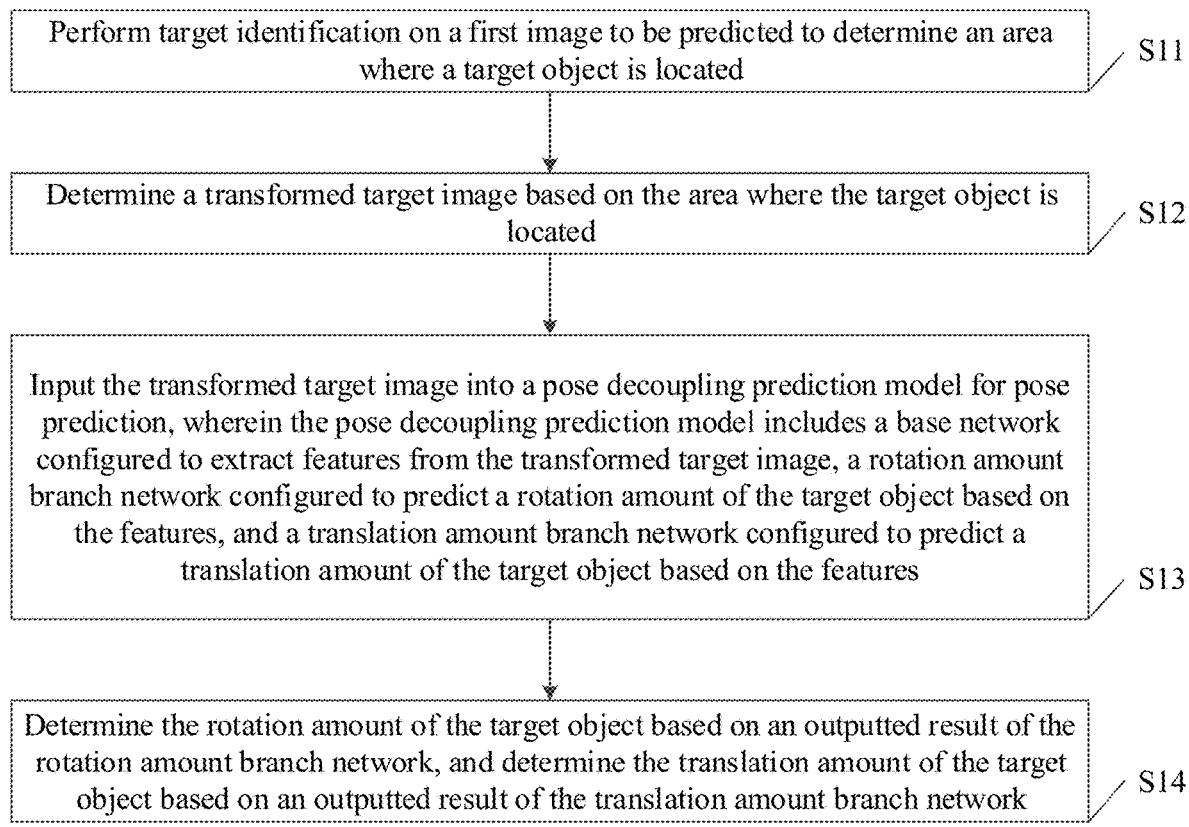
FIG. 2 illustrates a flowchart of a pose prediction method according to an embodiment of the present disclosure.

FIG. 2 illustrates a flowchart of a pose prediction method according to an embodiment of the present disclosure. The method can be executed by a terminal such as a laptop, a computer, or a personal assistant, and the method can be applied in the pose prediction network illustrated in FIG. 1. As illustrated in FIG. 1, the method may include the following steps.

At step S11, target identification is performed on a first image to be predicted to determine an area where a target object is located.

At step S12, a transformed target image is determined based on the area where the target object is located.

At step S13, the transformed target image is inputted into a pose decoupling prediction model for pose prediction. The pose decoupling prediction model includes a base network, a rotation amount branch network, and a translation amount branch network. The base network is configured to extract features from the transformed target image. The rotation amount branch network is configured to predict a rotation amount of the target object based on the features. The translation amount branch network is configured to predict a translation amount of the target object based on the features.

At step S14, the rotation amount of the target object is determined based on an outputted result of the rotation amount branch network and the translation amount of the target object is determined based on an outputted result of the translation amount branch network.

In some embodiments of the present disclosure, the rotation amount branch network of the pose decoupling prediction model can predict the rotation amount of the target object and the translation amount branch network of the pose decoupling prediction model can predict the translation amount of the target object, which realize decoupling of rotation and translation in the object pose. In this way, it is conducive to adopt different strategies to predict the rotation amount and the translation amount with respect to the properties of the rotation and the translation in the object pose, so as to achieve a high-accuracy estimation of the rotation amount and a high-accuracy estimation of the translation amount, and improve the accuracy of pose prediction.

At step S11, the first image represents an image in which a pose of an object is to be predicted, and the first image includes the target object the pose of which is to be predicted. The terminal can input the first image into the object detector illustrated in FIG. 1, and perform the target identification on the first image to obtain the area where the target object is located in the first image. In some embodiments of the present disclosure, the area where the target object is located is a rectangle. In an example, pixel coordinates $(C_x, C_y)$ in the first image of a center C of the area where the target object is located and a maximum size S of the area where the target object is located can be used to represent the area where the target object is located, where S=max(h, w), h represents a height of the area where the target object is located, and w represents a width of the area where the target object is located.

At step S12, the terminal can determine the transformed target image based on the area where the target object is located. Since the transformed target image needs to be inputted into the pose decoupling prediction model used subsequently to predict the rotation amount and the translation amount, a size of the transformed target image should be consistent with a desired size for input of the pose decoupling prediction model.

In a possible implementation, the terminal can extract the area where the target object is located from the first image to obtain a second image; and while maintaining an aspect ratio of the target object unchanged, a size of the second image is transformed into the desired size for input of the pose decoupling prediction model input to obtain the transformed target image.

It should be noted that the terminal can make zero padding around a scaled image as needed to obtain the transformed target image.

At step S13, the terminal can input the transformed target image obtained at step S12 into the pose decoupling prediction model. Specifically, the terminal can input the transformed target image into the base network of the pose decoupling prediction model, and the base network extracts features from the transformed target image; and then, the terminal can use the features as inputs of the rotation amount branch network and the translation amount branch network respectively, in such a manner that at step S14, the terminal respectively predicts the rotation amount of the target object and the translation amount of the target object based on the outputted results of the rotation amount branch network and the translation amount branch network.

In a possible implementation, the outputted result of the rotation amount branch network may include an object coordinate diagram having three channels and an object partition diagram having one channel. The three channels of the object coordinate diagram represent coordinate values of three dimensions of a position at which the predicted target object is located in a three-dimensional coordinate system, respectively. The object partition diagram is configured to partition the target object off from the transformed target image.

The coordinate values of the three dimensions represent coordinate values of an x-axis, a y-axis, and a z-axis in the three-dimensional coordinate system. The object partition diagram may be a binary image. For example, a position having a pixel value of 0 indicates that the pixel at that position belongs to the target object, and a position having a pixel value of 255 indicates that the pixel at that position does not belong to the target object.

In a possible implementation, determining the rotation amount of the target object based on the outputted result of the rotation amount branch network at step S14 may include: determining the rotation amount of the target object based on the object coordinate diagram, the object partition diagram, and pixel coordinates in the first image of the area where the target object is located.

Figure 3:
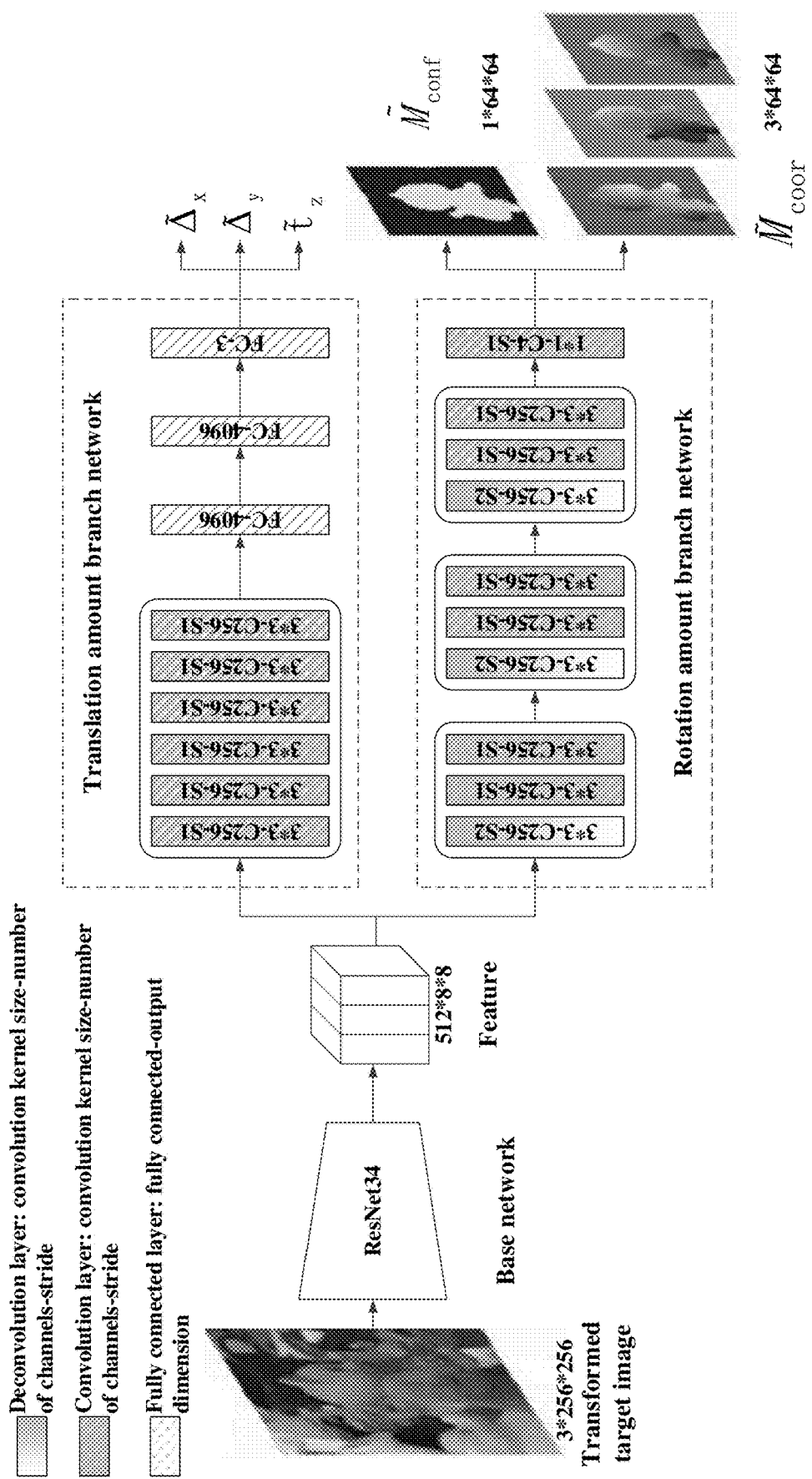
FIG. 3 illustrates an example of a pose decoupling prediction model according to an embodiment of the present disclosure.

FIG. 3 illustrates an example of a pose decoupling prediction model according to an embodiment of the present disclosure. As illustrated in FIG. 3, the base network adopts a 34-layer residual convolutional neural network (ResNet34); the rotation amount branch network includes three feature processing modules and one convolution output layer, and each feature processing module includes one deconvolution layer and two convolution layers; and the translation amount branch network is formed by a stack of six convolution layers and three fully connected layers. In the feature processing module of the rotation amount branch network, the deconvolution layer can amplify a resolution of the features, and the convolution layers can process the features.

As illustrated in FIG. 3, the terminal inputs a transformed target image having three channels and a size of 256*256 into a 34-layer residual convolutional neural network to output a feature of 512 channels, each channel having a size of 8*8. Then the terminal inputs the feature into the rotation amount branch network. The rotation amount branch network outputs an object coordinate diagram having three channels and a size of 64*64, $\tilde{M}_{coor}$ and an object partition diagram having one channel and a size of 64*64, $\tilde{M}_{conf}$. The three channels of the object coordinate diagram $\tilde{M}_{coor}$ represent the coordinate values of the x-axis, y-axis and z-axis of a predicted target object in the three-dimensional coordinate system. Subsequently, as illustrated in FIG. 1, the terminal can find the area where the target object is located in the object coordinate diagram $\tilde{M}_{coor}$ based on the object partition diagram $\tilde{M}_{conf}$, and map each pixel in the area to the first image, thereby establishing a corresponding relation between the pixel coordinates of the target object in the first image and the three-dimensional coordinates of the target object. Finally, the terminal can use geometric methods such as the PnP algorithm to solve the corresponding relation, so as to obtain the rotation amount R of the target object.

Since the indirect method can obtain a relatively accurate rotation amount, the pose prediction method according to the embodiments of the present disclosure improves the accuracy of predicting the rotation amount compared with a method of adopting the direct method to determine both the rotation amount and the translation amount.

In a possible implementation, the outputted result of the translation amount branch network includes a scale invariant translation amount, the scale invariant translation amount is a translation amount of a center of the target object in the transformed target image relative to a center of the transformed target image, and the scale invariant translation includes three dimensions.

In a possible implementation manner, determining the translation amount of the target object based on the outputted result of the translation amount branch network may include: determining the translation amount of the target object based on the scale invariant translation amount, pixel coordinates in the first image of a center of the area where the target object is located, a size in the image of the area where the target object is located, and parameter information of a camera.

As illustrated in FIG. 3, the terminal inputs, into the translation amount branch network, the feature of 512 channels with a size of 8*8 outputted from the transformed target image. The translation amount branch network outputs a scale invariant translation amount $T_s$, the scale invariant translation amount $T_s$ is a translation amount of the center of the target object in the transformed target image relative to the center of the transformed target image, and the scale invariant translation amount $T_s$ includes three dimensions $\tilde{\Delta}_x$, $\tilde{\Delta}_y$ and $\tilde{t}_z$. The scale invariant translation amount $T_s$ is defined as shown in formula (1):

$$\begin{cases} \tilde{\Delta}_x = \dfrac{o_x - c_x}{w} \\ \tilde{\Delta}_y = \dfrac{o_y - c_y}{h}, \\ \tilde{t}_Z = \dfrac{T_z}{r} \end{cases} \qquad \text{formula (1)}$$

where $O_x$ and $O_y$ represent real pixel coordinates of the center of the target object in the first image, $C_x$ and $C_y$ represent pixel coordinates in the first image of the center of the area where the target object is located (that is, the pixel coordinates in the first image of the center of the target object detected by the object detector), r represents a desired scaling ratio (corresponding to the transformed target image) for inputting, into the pose decoupling prediction model, the area where the target object detected by the object detector is located and which has been extracted (corresponding to the second image), that is, a scaling ratio of the second image in a process of generating the transformed target image from the second image. The scaling ratio r may be determined based on a size of the second image and a size of the transformed target image. w represents a width of the area where the target object detected by the object detector is located, and h represents a height of the area where the target object detected by the object detector is located.

As illustrated in FIG. 1, the terminal can combine $\tilde{\Delta}_x$, $\tilde{\Delta}_y$ and $\tilde{t}_z$ outputted from the translation amount branch network, the pixel coordinates ($C_x$ and $C_y$) in the first image of the center of the area where the target object is located, the size (h and w) in the first image of the area where the target object is located, and the parameter information of the camera (a focal length $f_x$ of the camera on the x-axis and a focal length $f_y$ of the camera on the y-axis) to obtain a final translation amount of the target object, T ($T_x$, $T_y$, $T_z$). The combination manner is shown in formula (2):

$$\begin{cases} T_x = (\tilde{\Delta}_x \cdot w + C_x) \cdot \dfrac{T_z}{f_x} \\ T_y = (\tilde{\Delta}_y \cdot h + C_y) \cdot \dfrac{T_z}{f_y} \\ T_z = r \cdot \tilde{t}_Z \end{cases} \quad \text{formula (2)}$$

Since the direct method can obtain a relatively accurate translation amount, the pose prediction method according to the embodiments of the present disclosure improves the accuracy of predicting the translation amount compared with the method of determining both the rotation amount and the translation amount by the indirect method.

Figure 4:
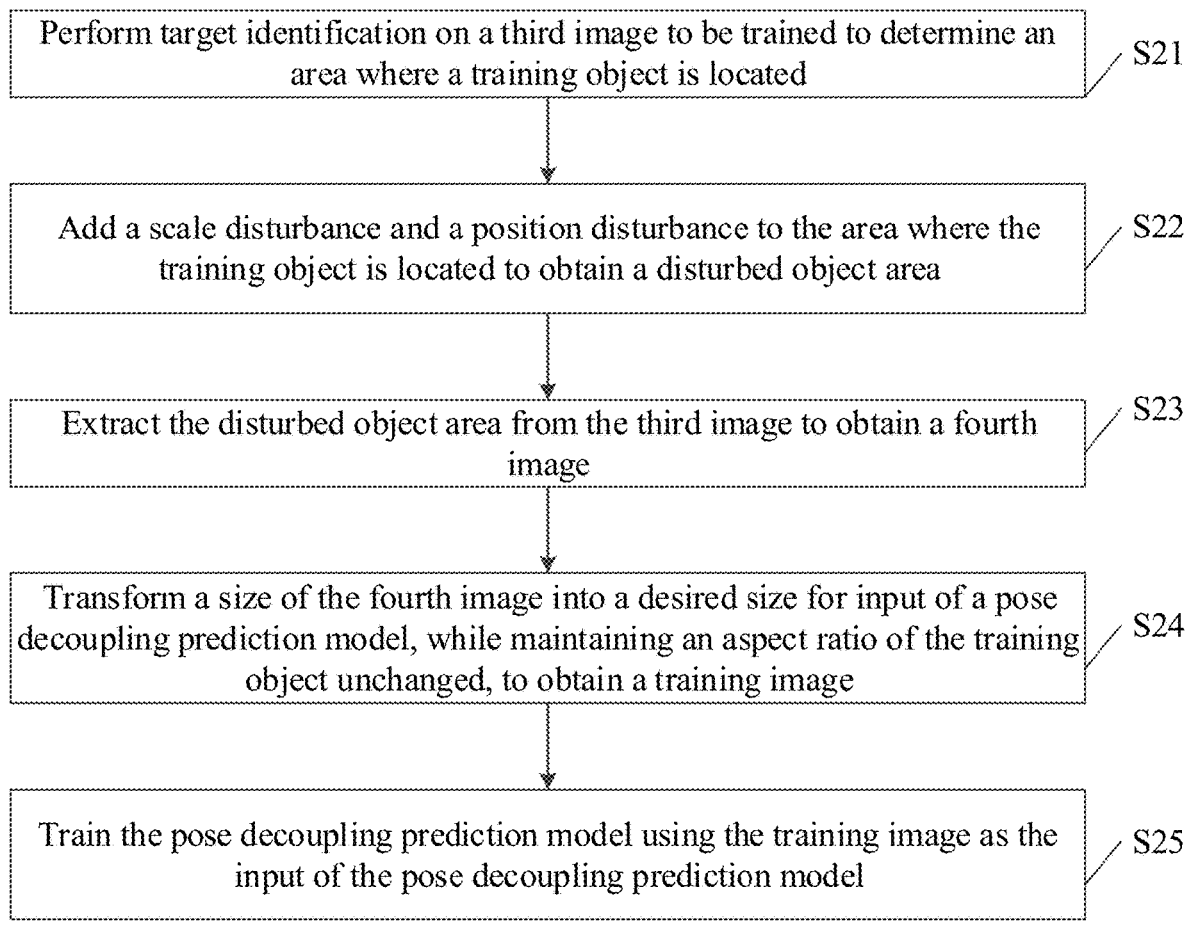
FIG. 4 illustrates a flowchart of a model training method according to an embodiment of the present disclosure.

FIG. 4 illustrates a flowchart of a model training method according to an embodiment of the present disclosure. The method can be executed by the terminal, and the method can be used to train the pose decoupling prediction model as illustrated in FIG. 1 and FIG. 3. As illustrated in FIG. 4, the method may include the following steps.

At step S21, target recognition is performed on a third image to be trained to determine an area where a training object is located.

At step S22, a scale disturbance and a position disturbance are added to the area where the training object is located, to obtain a disturbed object area.

At step S23, the disturbed object area is extracted from the third image to obtain a fourth image.

At step S24, while maintaining an aspect ratio of the training object unchanged, a size of the fourth image is transformed into a desired size for input of a pose decoupling prediction model to obtain a training image.

At step S25, the pose decoupling prediction model is trained using the training image as an input of the pose decoupling prediction model.

In some embodiments of the present disclosure, by adding disturbance to a result of the target identification, on the one hand, a sample volume is expanded, and on the other hand, the influence of target identification error on the outputted result of the pose decoupling prediction model is reduced, and the accuracy of the pose decoupling prediction model is improved.

At step S21, the third image may represent a sample image used to train the pose decoupling prediction model, and the third image includes the training object to be predicted during the training process. The terminal may use the object detector illustrated in FIG. 1 to perform the target identification on the third image to obtain the area where the training object is located. Step S21 can refer to step S11, which will not be repeated here.

At step S22, the terminal may add the scale disturbance and the position disturbance to the area where the training object is located to obtain the disturbed object area. At step S23, the terminal may extract the disturbed object area from the third image to obtain the fourth image.

In an example, suppose that a center and a maximum size of the area where the training object is located are C and s, respectively, where C=($C_x$, $C_y$), s=max(h, w), $C_x$ and $C_y$ represent pixel coordinates in the first image of the center of the area where the training object is located, h and w respectively represent a height and a width of the area where the training object is located. The terminal can re-sample the center and the size of the area where the training object is located based on a certain random distribution that depends on C and S, such as a truncated normal distribution function, to obtain a center $\tilde{C}$ and a maximum size $\tilde{s}$ of the area where the training object subsequent to the sampling, and then based on the pair of $\tilde{C}$ and $\tilde{s}$, the fourth image is extracted from the third image.

At step S24, the terminal may transform the size of the fourth image into the desired size for input of the pose decoupling prediction model while maintaining the aspect ratio of the training object unchanged to obtain the training image. Step S24 can refer to step S12, which will not be repeated here.

At step S25, the terminal may train the pose decoupling prediction model using the training image as the input of the pose decoupling prediction model.

It is understood that a plurality of fourth images can be extracted from one third image through step S22 and step S23, and correspondingly, at step S24, the terminal can obtain a plurality of training images based on the plurality of fourth images. In other words, based on one third image, a plurality of training images used to train the pose decoupling prediction model can be obtained. In this way, on the one hand, the sample volume is expanded, and on the other hand, part of the target identification error is eliminated, which reduces the influence of the target identification error on the pose decoupling prediction model, and improves the prediction accuracy of the pose decoupling prediction model.

In a possible implementation, the pose decoupling prediction model may include a base network, a rotation amount branch network, and a translation amount branch network; the base network is configured to extract features from the training image; the rotation amount branch network is configured to use the features as an input thereof, an outputted result of the rotation amount branch network includes an object coordinate diagram having three channels and an object partition diagram having one channel, the three channels of the object coordinate diagram represent three coordinate values of a three-dimensional point of a predicted target object, respectively, and the object partition diagram is configured to partition the target object off from the training image; the translation amount branch network is configured to use the features as an input thereof, an outputted result of the translation amount branch network includes a scale invariant translation amount, the scale invariant translation amount is a translation amount of a center of the training object in the training image relative to a center of the transformed target image, and the scale invariant translation amount includes three dimensions.

In a possible implementation, the rotation amount branch network includes three feature processing modules and one convolution output layer, and each feature processing module includes one deconvolution layer and two convolution layers.

In a possible implementation, the translation amount branch network is formed by a stack of six convolution layers and three fully connected layers.

The above pose decoupling prediction model, base network, rotation amount branch network and translation amount branch network can refer to step S13, which will not be repeated here.

In a possible implementation, the method may further include: determining a first loss function based on the object coordinate diagram and the object partition diagram; determining a second loss function based on the scale invariant translation amount; training the base network and the rotation amount branch network by using the first loss function; training the translation amount branch network by using the second loss function while fixing parameters of the base network and parameters of the rotation amount branch network; and training the base network, the rotation amount branch network, and the translation amount branch network simultaneously by using the first loss function and the second loss function.

The terminal can determine the first loss function Loss1 by using formula (3) based on the object coordinate diagram $\tilde{M}_{coor}$ and the object partition diagram $\tilde{M}_{conf}$ outputted by the rotation amount branch network.

$$\text{Loss1} = \eta_1 \cdot \iota_1(\Sigma_{i=1}^{nc} M_{conf} \circ (M_{coor} - \tilde{M}_{coor})) + \eta_2 \cdot \iota_1 (M_{conf} - \tilde{M}_{conf}) \quad \text{formula (3)},$$

where $\eta_1$ and $\eta_2$ represent weights of loss of respective parts, $\iota_1$ represents a 1-norm function, $\circ$ represents the Hadamard product, and $n_c$ is equal to 3, and is the number of channels of the object coordinate diagram $M_{coor}$. $M_{coor}$ and $M_{conf}$ represent a real object coordinate diagram and a real object partition diagram, and $\tilde{M}_{coor}$ and $\tilde{M}_{conf}$ represent an object coordinate diagram and an object partition map predicted by the rotation amount branch network.

The terminal can determine the second loss function Loss2 by using formula (4) based on three dimensions $\tilde{\Delta}_x$, $\tilde{\Delta}_y$ and $\tilde{t}_z$ of the scale invariant translation outputted by the translation amount branch network.

$$\text{Loss2} = \iota_2(\iota_3 \cdot (\Delta_x - \tilde{\Delta}_x) + \eta_4 \cdot (\Delta_y - \tilde{\Delta}_y) + \eta_5 \cdot (t_z - \tilde{t}_z)) \quad \text{formula (4)},$$

where $\eta_3$, $\eta_4$, and $\eta_5$ represents weights of loss of respective parts, $\iota_2$ represents a 2-norm function, $\Delta_x$ and $\tilde{\Delta}_x$ represent a true value and a predicted value of the scale invariant translation amount in the x-axis direction, respectively, and $\Delta_y$ and $\tilde{\Delta}_y$ represent a true value and a predicted value of the scale invariant translation amount on the y-axis, respectively, and $t_z$ and $\tilde{t}_z$ represent a true value and a predicted value of the scale invariant translation amount on the z-axis, respectively.

It should be noted that the true values $M_{coor}$, $M_{conf}$, $\Delta_x$, $\Delta_y$, and $t_z$ in formula (3) and formula (4) can be determined during the process of taking pictures of the training object with the camera. Respective training images obtained based on one and the same third image correspond to the same true values.

After determining the first loss function and the second loss function, the terminal can train the pose decoupling prediction model in three stages. Training stage 1: the base network and the rotation amount branch network are trained by using the first loss function. Training phase 2: the translation amount branch network is trained by using the second loss function while fixing the parameters of the base network and the parameters of the rotation amount branch network. Training stage 3: the base network, the rotation amount branch network, and the translation amount branch network are simultaneously trained by using the first loss function and the second loss function.

Using the training stage 1 and the training stage 2, the mutual influence between the rotation amount branch network and the translation amount branch network can be avoided. Using the training stage 3, the accuracy of the pose decoupling prediction model can be improved.

Figure 5:
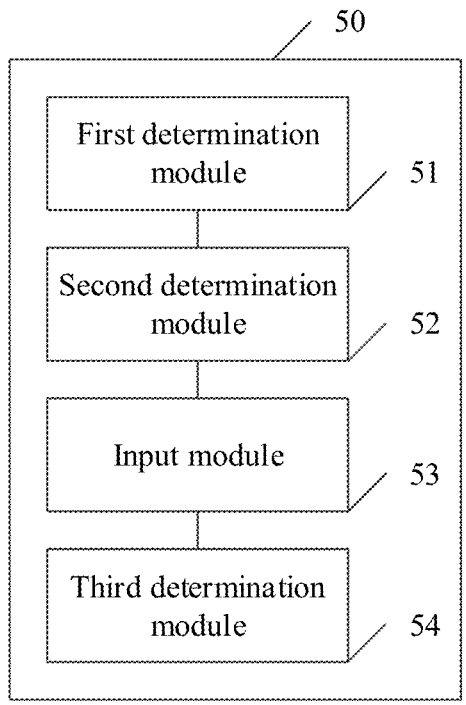
FIG. 5 illustrates a block diagram of a pose prediction apparatus according to an embodiment of the present disclosure.

FIG. 5 illustrates a block diagram of a pose prediction apparatus according to an embodiment of the present disclosure. As illustrated in FIG. 5, the apparatus 50 may include a first determination module 51 configured to perform target identification on a first image to be predicted to determine an area where a target object is located; a second determination module 52 configured to determine a transformed target image based on the area where the target object is located; an input module 53 configured to input the transformed target image into a pose decoupling prediction model for pose prediction, wherein the pose decoupling prediction model includes a base network, a rotation amount branch network, and a translation amount branch network, the base network is configured to extract features from the transformed target image, the rotation amount branch network is configured to predict a rotation amount of the target object based on the features, and the translation amount branch network is configured to predict a translation amount of the target object based on the features; and a third determination module 54 configured to determine the rotation amount of the target object based on an outputted result of the rotation amount branch network and determine the translation amount of the target object based on an outputted result of the translation amount branch network.

In some embodiments of the present disclosure, the rotation amount of the target object can be predicted by the rotation amount branch network of the pose decoupling prediction model and the translation amount of the target object can be predicted by the translation amount branch network of the pose decoupling prediction model, which realizes decoupling of rotation and translation in the object pose. In this way, it is conducive to adopt different strategies to predict the rotation amount and the translation amount with respect to properties of the rotation and the translation in the object pose, so as to achieve a high-accuracy estimation of both the rotation amount and the translation amount, and improve the accuracy of pose prediction.

In a possible implementation, the second determination module is further configured to: extract the area where the target object is located from the first image to obtain a second image; and transform a size of the second image into a desired size for input of the pose decoupling prediction model, while maintaining an aspect ratio of the target object unchanged, to obtain the transformed target image.

In a possible implementation, the outputted result of the rotation amount branch network includes an object coordinate diagram having three channels and an object partition diagram having one channel. The three channels of the object coordinate diagram represent coordinate values of three dimensions of a position at which the predicted target object is located in a three-dimensional coordinate system, respectively. The object partition diagram is configured to partition the target object off from the transformed target image. The third determination module is further configured to determine the rotation amount of the target object based on the object coordinate diagram, the object partition map, and pixel coordinates in the first image of the area where the target object is located.

In a possible implementation, the outputted result of the translation amount branch network includes a scale invariant translation amount, the scale invariant translation amount is a translation amount of a center of the target object in the transformed target image relative to a center of the transformed target image, and the scale invariant translation amount includes three dimensions. The third determination module is further configured to determine the translation amount of the target object based on the scale invariant translation amount, the pixel coordinates in the first image of a center of the area where the target object is located, a size in the first image of the area where the target object is located, and parameter information of a camera.

Figure 6:
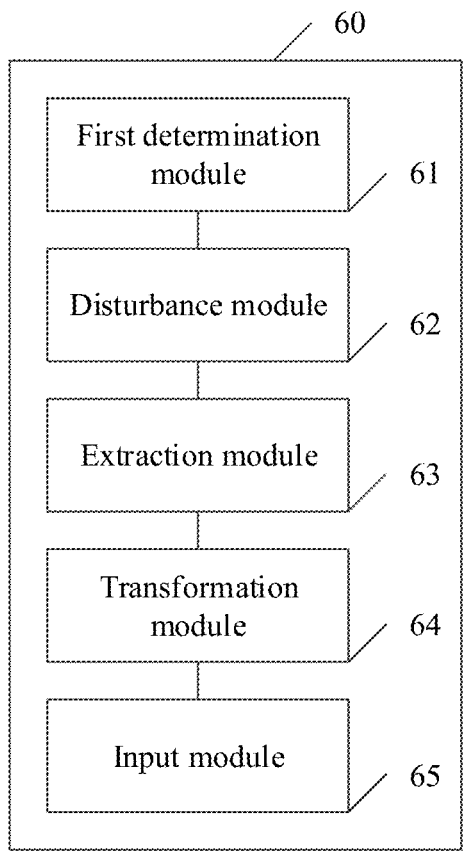
FIG. 6 illustrates a block diagram of a model training apparatus according to an embodiment of the present disclosure.

FIG. 6 illustrates a block diagram of a model training apparatus according to an embodiment of the present disclosure. As illustrated in FIG. 6, the apparatus 60 may include a first determination module 61 configured to perform target identification on a third image to be trained to determine an area where a training object is located; a disturbance module 62 configured to add a scale disturbance and a position disturbance to the area where the training object is located, to obtain a disturbed object area; an extraction module 63 configured to extract the disturbed object area from the third image to obtain a fourth image; a transformation module 64 configured to transform a size of the fourth image into a desired size for input of a pose decoupling prediction model while maintaining an aspect ratio of the training object unchanged to obtain a training image; and an input module 65 configured to train the pose decoupling prediction model using the training image as the input of the pose decoupling prediction model.

In some embodiments of the present disclosure, by adding disturbance to a result of the target identification, on the one hand, the sample volume is expanded, and on the other hand, the influence of target identification error on the outputted result of the pose decoupling prediction model is reduced, and the accuracy of the pose decoupling prediction model is improved.

In a possible implementation, the pose decoupling prediction model includes a base network, a rotation amount branch network, and a translation amount branch network. The base network is configured to extract features from the training image. The rotation amount branch network is configured to use the features as an input thereof, and an outputted result of the rotation amount branch network includes an object coordinate diagram having three channels and an object partition diagram having one channel. The three channels of the object coordinate diagram represent three coordinate values of a three-dimensional point of a predicted target object, respectively. The object partition diagram is configured to partition the target object off from the training image. The translation amount branch network is configured to use the features as an input thereof, an outputted result of the translation amount branch network includes a scale invariant translation amount. The scale invariant translation amount is a translation amount of a center of the training object in the training image relative to a center of a transformed target image. The scale invariant translation amount includes three dimensions.

In a possible implementation, the apparatus further includes a second determination module configured to determine a first loss function based on the object coordinate diagram and the object partition diagram; a third determination module configured to determine a second loss function based on the scale invariant translation amount; a first training module configured to train the base network and the rotation amount branch network by using the first loss function; a second training module configured to train the translation amount branch network by using the second loss function while fixing parameters of the base network and parameters of the rotation amount branch network; and a third training module configured to train the base network, the rotation amount branch network, and the translation amount branch network simultaneously by using the first loss function and the second loss function.

In a possible implementation, the rotation amount branch network includes three feature processing modules and one convolution output layer, and each feature processing module includes one deconvolution layer and two convolution layers.

In a possible implementation, the translation amount branch network is formed by a stack of six convolution layers and three fully connected layers.

Figure 7:
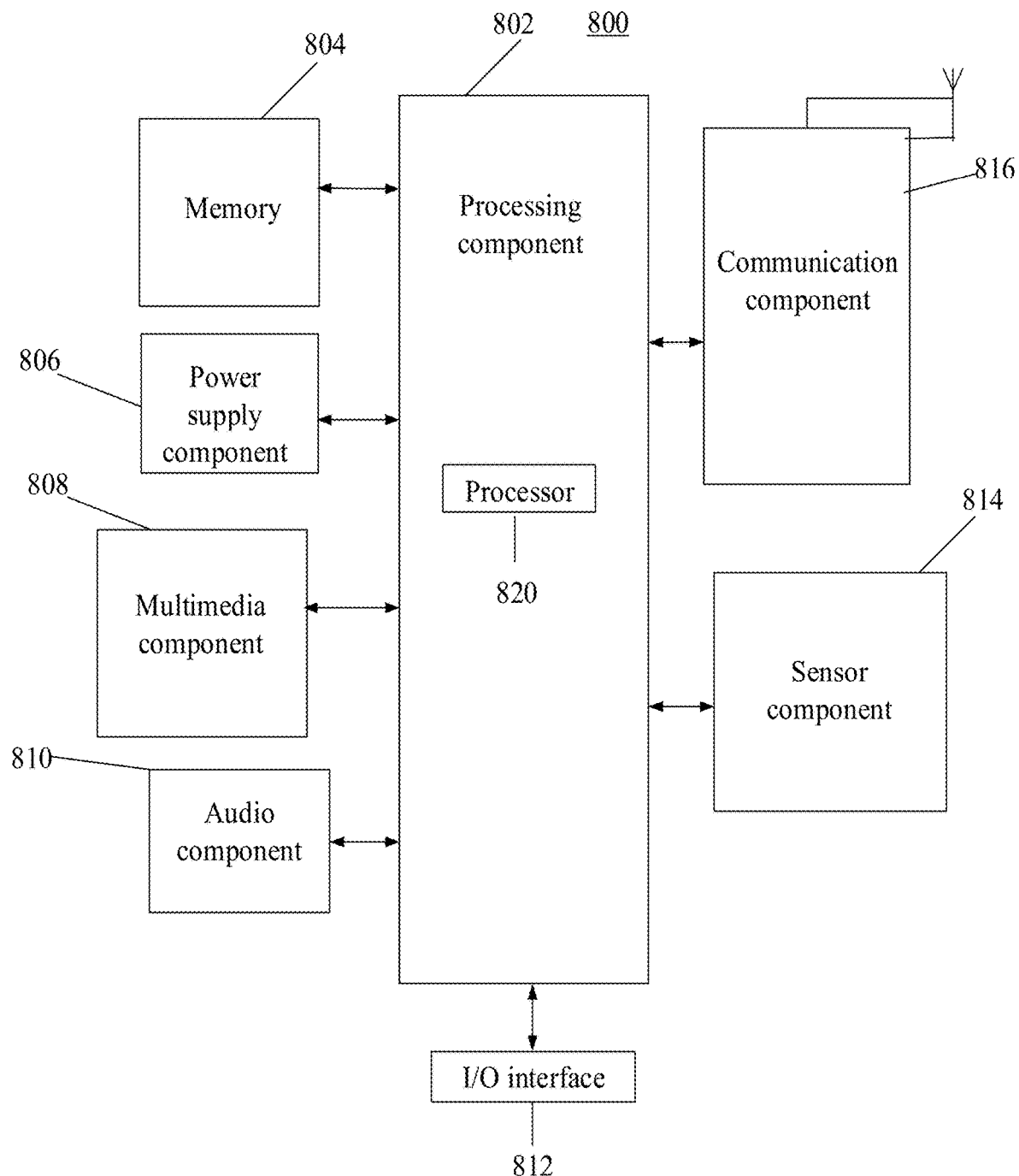
FIG. 7 is a block diagram illustrating an apparatus for pose prediction and model training according to an exemplary embodiment.

FIG. 7 is a block diagram illustrating an apparatus 800 for pose prediction and model training according to an exemplary embodiment. For example, the apparatus 800 may be a mobile phone, a computer, a digital broadcasting terminal, a message transceiving device, a game console, a tablet device, a medical device, a fitness device, a personal digital assistant, etc.

Referring to FIG. 7, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the apparatus 800, such as operations associated with display, telephone calls, data communications, camera operations, and recording operations. The processing component 802 may include one or more processors 820 to execute instructions to implement all or some of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operation in the apparatus 800. Examples of these data include instructions for any application or method operating on the apparatus 800, contact data, phone book data, messages, pictures, videos, etc. The memory 804 can be implemented by any type of volatile or non-volatile storage devices or a combination thereof, such as a static random access memory (SRAM), an electrically erasable programmable read-only memory (EEPROM), an erasable and programmable read only memory (EPROM), a programmable read only memory (PROM), a read only memory (ROM), a magnetic memory, a flash memory, a magnetic disk or an optical disk.

The power supply component 806 provides power for various components of the apparatus 800. The power supply component 806 may include a power management system, one or more power supplies, and other components associated with the generation, management, and dispensing of power for the apparatus 800.

The multimedia component 808 includes a screen that provides an output interface between the apparatus 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense a boundary of a touch or sliding action, but also detect a duration and pressure related to the touch or sliding operation. In some embodiments, the multimedia component 808 includes a front camera and/or a rear camera. When the apparatus 800 is in an operation mode, such as a shooting mode or a video mode, the front camera and/or the rear camera can receive external multimedia data. Each of the front camera and the rear camera can be a fixed optical lens system or have a focal length and optical zoom capabilities.

The audio component 810 is configured to output and/or input audio signals. For example, the audio component 810 includes a microphone (MIC), and when the apparatus 800 is in an operation mode, such as a calling mode, a recording mode, and a voice recognition mode, the microphone is configured to receive an external audio signal. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include but are not limited to: a home button, a volume button, a start button, and a lock button.

The sensor component 814 includes one or more sensors for providing the apparatus 800 with various aspects of status assessment. For example, the sensor component 814 can detect an activated/inactivated state of the apparatus 800 and a relative positioning of components, such as a relative positioning of a display and a keypad of the apparatus 800. The sensor component 814 can further detect a position change of the apparatus 800 or a component of the apparatus 800, presence or absence of contact between the user and the apparatus 800, an orientation or acceleration/deceleration of the apparatus 800, and a temperature change of the apparatus 800. The sensor component 814 may include a proximity sensor configured to detect presence of nearby objects without any physical contact. The sensor component 814 may further include a light sensor, such as a CMOS or CCD image sensor, for use in imaging applications. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 can have access to a wireless network based on a communication standard, such as WiFi, 2G, or 3G, or a combination thereof. In an exemplary embodiment, the communication component 816 receives a broadcast signal or broadcast related information from an external broadcast management system via a broadcast channel. In an exemplary embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components to implement the above method.

In an exemplary embodiment, provided is a non-volatile computer-readable storage medium, such as a memory 804 including computer program instructions, which can be executed by the one or more processors 820 of the apparatus 800 to implement the foregoing method.

The present disclosure may be a system, method and/or computer program product. The computer program product may include a computer-readable storage medium having computer-readable program instructions loaded thereon, the computer-readable program instructions be configured for enabling a processor to implement various aspects of the present disclosure.

The computer-readable storage medium may be a tangible device that can hold and store instructions used by an instruction execution device. The computer-readable storage medium may be, for example, but not limited to, an electrical storage device, a magnetic storage device, an optical storage device, an electromagnetic storage device, a semiconductor storage device, or any suitable combination thereof. More specific examples (non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device, a punched card or protrusions in groove for example with instructions stored thereon, and any suitable combination thereof. The computer-readable storage medium used here is not interpreted as a transient signal itself, such as radio waves or other freely propagating electromagnetic waves, electromagnetic waves propagating through waveguides or other transmission media (for example, light pulses through fiber-optic cables), or electrical signals transmitted through wires.

The computer-readable program instructions described herein can be downloaded from a computer-readable storage medium to various computing/processing devices, or downloaded to an external computer or an external storage device via a network, such as the Internet, a local area network, a wide area network, and/or a wireless network. The network may include a copper transmission cable, optical fiber transmission, wireless transmission, a router, a firewall, a switchboard, a gateway computer, and/or an edge server. A network adapter card or network interface in each computing/processing device receives computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, status setting data, or source code or object code written in any combination of one or more programming languages, the one or more programming languages include object-oriented programming languages such as Smalltalk, C++, etc., and conventional procedure-oriented programming languages such as "C" language or similar programming languages. Computer-readable program instructions can be executed entirely on a user's computer, partly executed on the user's computer, executed as a stand-alone software package, partly executed on the user's computer and partly executed on a remote computer, or entirely executed on the remote computer or a server. In the case that a remote computer is involved, the remote computer can be connected to the user's computer through any kind of network, including a local area network (LAN) or a wide area network (WAN), or can be connected to an external computer (for example, connected via the Internet provided by an Internet service provider). In some embodiments, an electronic circuit, such as a programmable logic circuit, a field programmable gate array (FPGA), or a programmable logic array (PLA), can be customized by using status information of the computer-readable program instructions. The computer-readable program instructions are executed by the electronic circuit to realize various aspects of the present disclosure.

Here, various aspects of the present disclosure are described with reference to flowcharts and/or block diagrams of methods, apparatuses (systems) and computer program products according to embodiments of the present disclosure. It should be understood that each block of the flowcharts and/or block diagrams and combinations of blocks in the flowcharts and/or block diagrams can be implemented by computer-readable program instructions.

These computer-readable program instructions can be provided to the processor of a general-purpose computer, a special-purpose computer, or other programmable data processing device, thereby producing a machine that generates the apparatuses implementing functions/actions specified in one or more blocks in the flowchart and/or block diagram when these instructions are executed by a processor of the computer or other programmable data processing apparatus. It is possible to store these computer-readable program instructions in a computer-readable storage medium. These instructions make the computer, the programmable data processing apparatus, and/or other devices operate in a specific manner, so that the computer-readable medium having the instructions stored thereon includes an article of manufacture, which includes instructions for implementing various aspects of the functions/actions specified in one or more blocks in the flowcharts and/or block diagrams.

It is possible to load computer-readable program instructions onto the computer, other programmable data processing apparatus, or other device, so that a series of operation steps are executed on the computer, other programmable data processing apparatus, or other device to produce a computer-implemented process, so that the instructions executed on the computer, other programmable data processing apparatus, or other device realize the functions/actions specified in one or more blocks in the flowcharts and/or block diagrams.

The flowcharts and block diagrams in the accompanying drawings illustrate the possible implementation architecture, functions, and operations of the system, method, and computer program product according to a plurality of embodiments of the present disclosure. In this regard, each block in the flowcharts or block diagrams can represent a module, a program segment, or a part of instructions, and the module, program segment, or part of instructions contains one or more executable instructions for realizing the specified logical function. In some alternative implementations, the functions indicated in the block may occur in a different order from the order indicated in the drawings. For example, two consecutive blocks can actually be executed in parallel, or they can sometimes be executed in a reverse order, depending on the functions involved. It should be noted that each block in the block diagrams and/or flowcharts and a combination of the blocks in the block diagrams and/or flowcharts can be implemented by a dedicated hardware-based system that performs the specified functions or actions or can be realized by a combination of dedicated hardware and computer instructions.

The embodiments of the present disclosure have been described above, and the above description is exemplary but not exhaustive, and the present disclosure is not limited to the disclosed embodiments. Without departing from the scope and essence of the described embodiments, many modifications and changes are apparent to those of ordinary skill in the art. The choice of terms used herein is intended to best explain the principles of various embodiments, practical applications of various embodiments, or technical improvements to the technologies in the market, or to enable other persons of ordinary skilled in the art to understand the embodiments disclosed herein.

What is claimed is:

1. A pose prediction method, comprising:
   performing target identification on a first image to be predicted to determine an area where a target object is located;
   determining a transformed target image based on the area where the target object is located;
   inputting the transformed target image into a pose decoupling prediction model for pose prediction, wherein the pose decoupling prediction model comprises a base network configured to extract features from the transformed target image, a rotation amount branch network configured to predict a rotation amount of the target object based on the features, and a translation amount branch network configured to predict a translation amount of the target object based on the features; and
   determining the rotation amount of the target object based on an outputted result of the rotation amount branch network, and determining the translation amount of the target object based on an outputted result of the translation amount branch network.

2. The method according to claim 1, wherein said determining the transformed target image based on the area where the target object is located comprises:
   extracting the area where the target object is located from the first image to obtain a second image; and
   transforming a size of the second image into a desired size for input of the pose decoupling prediction model, while maintaining an aspect ratio of the target object unchanged, to obtain the transformed target image.

3. The method according to claim 1, wherein the outputted result of the rotation amount branch network comprises an object coordinate diagram having three channels and an object partition diagram having one channel, the three channels of the object coordinate diagram represent coordinate values of three dimensions of a position at which a predicted target object is located in a three-dimensional coordinate system, respectively, and the object partition diagram is configured to partition the target object off from the transformed target image, and
   wherein said determining the rotation amount of the target object based on the outputted result of the rotation amount branch network comprises:
   determining the rotation amount of the target object based on the object coordinate diagram, the object partition diagram, and pixel coordinates in the first image of the area where the target object is located.

4. The method according to claim 1, wherein said the outputted result of the translation amount branch network comprises a scale invariant translation amount, wherein the scale invariant translation amount is a translation amount of a center of the target object in the transformed target image relative to a center of the transformed target image, and the scale invariant translation amount comprises three dimensions, and
   wherein said determining the translation amount of the target object based on the outputted result of the translation amount branch network comprises:
   determining the translation amount of the target object based on the scale invariant translation amount, pixel coordinates in the first image of a center of the area where the target object is located, a size in the first image of the area where the target object is located, and parameter information of a camera.

5. A model training method, comprising:
  performing target identification on a third image to be trained to determine an area where a training object is located;
  adding a scale disturbance and a position disturbance to the area where the training object is located to obtain a disturbed object area;
  extracting the disturbed object area from the third image to obtain a fourth image;
  transforming a size of the fourth image into a desired size for input of a pose decoupling prediction model, while maintaining an aspect ratio of the training object unchanged, to obtain a training image; and
  training the pose decoupling prediction model using the training image as the input of the pose decoupling prediction model.

6. The method according to claim 5, wherein the pose decoupling prediction model comprises a base network, a rotation amount branch network, and a translation amount branch network; the base network is configured to extract features from the training image; the rotation amount branch network is configured to use the features as an input thereof, an outputted result of the rotation amount branch network comprises an object coordinate diagram having three channels and an object partition diagram having one channel, the three channels of the object coordinate diagram represent three coordinate values of a three-dimensional point of a predicted target object, and the object partition diagram is configured to partition the target object off from the training image; and the translation amount branch network is configured to use the features as an input thereof, an outputted result of the translation amount branch network comprises a scale invariant translation amount, the scale invariant translation amount is a translation amount of a center of the training object in the training image relative to a center of a transformed target image, and the scale invariant translation amount comprises three dimensions.

7. The method according to claim 6, further comprising:
  determining a first loss function based on the object coordinate diagram and the object partition diagram;
  determining a second loss function based on the scale invariant translation amount;
  training the base network and the rotation amount branch network by using the first loss function;
  training the translation amount branch network by using the second loss function while fixing parameters of the base network and parameters of the rotation amount branch network; and
  training the base network, the rotation amount branch network, and the translation amount branch network simultaneously by using the first loss function and the second loss function.

8. The method according to claim 6, wherein the rotation amount branch network comprises three feature processing modules and one convolution output layer, and each of the three feature processing modules comprises one deconvolution layer and two convolution layers.

9. The method according to claim 6, wherein the translation amount branch network is formed by a stack of six convolution layers and three fully connected layers.

10. A pose prediction apparatus, comprising:
  a processor; and
  a memory having instructions stored thereon, the instruction being executable by the processor,
  wherein the processor is configured to implement the method according to claim 1.

11. The pose prediction apparatus according to claim 10, wherein said determining the transformed target image based on the area where the target object is located comprises:
  extracting the area where the target object is located from the first image to obtain a second image; and
  transforming a size of the second image into a desired size for input of the pose decoupling prediction model, while maintaining an aspect ratio of the target object unchanged, to obtain the transformed target image.

12. The pose prediction apparatus according to claim 10, wherein the outputted result of the rotation amount branch network comprises an object coordinate diagram having three channels and an object partition diagram having one channel, the three channels of the object coordinate diagram represent coordinate values of three dimensions of a position at which a predicted target object is located in a three-dimensional coordinate system, respectively, and the object partition diagram is configured to partition the target object off from the transformed target image, and
  wherein said determining the rotation amount of the target object based on the outputted result of the rotation amount branch network comprises:
  determining the rotation amount of the target object based on the object coordinate diagram, the object partition diagram, and pixel coordinates in the first image of the area where the target object is located.

13. The pose prediction apparatus according to claim 10, wherein said the outputted result of the translation amount branch network comprises a scale invariant translation amount, wherein the scale invariant translation amount is a translation amount of a center of the target object in the transformed target image relative to a center of the transformed target image, and the scale invariant translation amount comprises three dimensions, and
  wherein said determining the translation amount of the target object based on the outputted result of the translation amount branch network comprises:
  determining the translation amount of the target object based on the scale invariant translation amount, pixel coordinates in the first image of a center of the area where the target object is located, a size in the first image of the area where the target object is located, and parameter information of a camera.

14. A nonvolatile computer-readable storage medium having computer program instructions stored thereon, wherein the computer program instructions, when executed by a processor, implement the method according to claim 1.

15. A model training apparatus, comprising:
  a processor; and
  a memory having instructions stored thereon, the instructions being executable by the processor,
  wherein the processor is configured to implement the method according to claim 5.

16. The model training apparatus according to claim 15, wherein the pose decoupling prediction model comprises a base network, a rotation amount branch network, and a translation amount branch network; the base network is configured to extract features from the training image; the rotation amount branch network is configured to use the features as an input thereof, an outputted result of the rotation amount branch network comprises an object coordinate diagram having three channels and an object partition diagram having one channel, the three channels of the object coordinate diagram represent three coordinate values of a three-dimensional point of a predicted target object, and the object partition diagram is configured to partition the target object off from the training image; and the translation amount branch network is configured to use the features as an input thereof, an outputted result of the translation amount branch network comprises a scale invariant translation amount, the scale invariant translation amount is a translation amount of a center of the training object in the training image relative to a center of a transformed target image, and the scale invariant translation amount comprises three dimensions.

17. The model training apparatus according to claim 16, wherein the method further comprises:
   determining a first loss function based on the object coordinate diagram and the object partition diagram;
   determining a second loss function based on the scale invariant translation amount;
   training the base network and the rotation amount branch network by using the first loss function;
   training the translation amount branch network by using the second loss function while fixing parameters of the base network and parameters of the rotation amount branch network; and
   training the base network, the rotation amount branch network, and the translation amount branch network by using the first loss function and the second loss function.

18. The model training apparatus according to claim 16, wherein the rotation amount branch network comprises three feature processing modules and one convolution output layer, and each of the three feature processing modules comprises one deconvolution layer and two convolution layers.

19. The model training apparatus according to claim 16, wherein the translation amount branch network is formed by a stack of six convolution layers and three fully connected layers.

20. A nonvolatile computer-readable storage medium having computer program instructions stored thereon, wherein the computer program instructions, when executed by a processor, implement the method according to claim 5.

* * * * *